This invention relates to a composite film or article characterized by a high degree of light transmissivity and electrical conductivity. It relates, more particularly, to a film adapted for use on transparent base surfaces and the process of application.

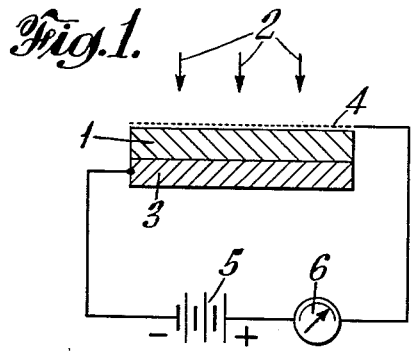
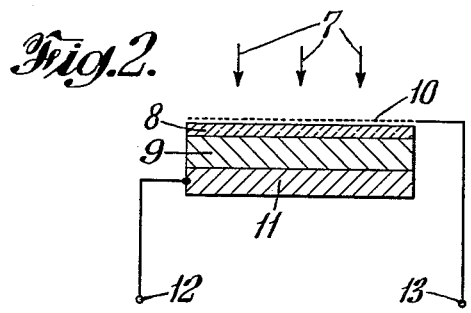
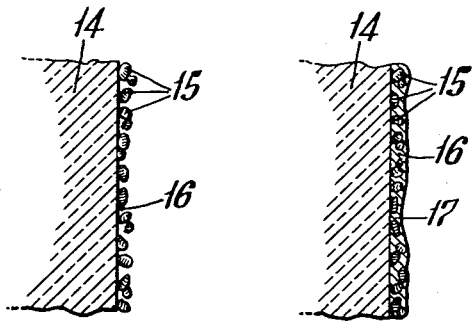
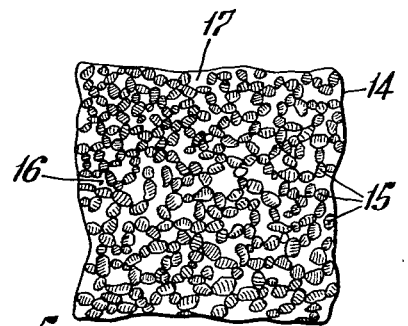
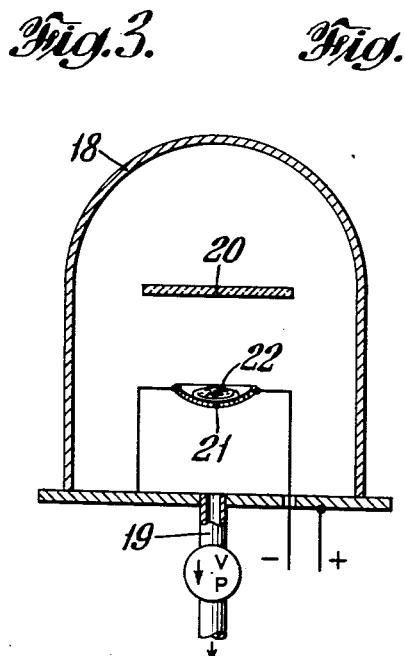
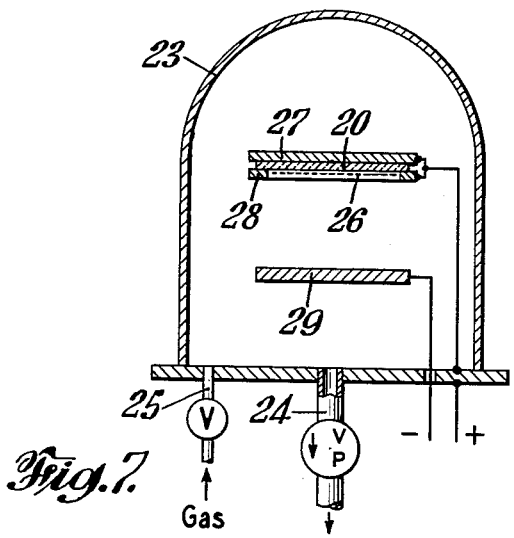
INVENTORS
JEAN L. VAN CAKENBERGHE
JEAN-MARIE F. GILLES
ATTORNEY 3,039,896
TRANSPARENT ELECTRICALLY CONDUCTIVE
FILM AND METHOD OF MAKING THE SAME
Jean Leon Van Cakenberghe, Sables, Beersel, and Jean-
Marie F. Gilles, Brussels, Belgium, assignors to Union
Carbide Corporation, a corporation of New York
Filed Feb. 24, 1959, Ser. No. 829,951
15 Claims. (Cl. 117—211)

This application is a continuation-in-part of our co-pending U.S. patent application, Serial No. 651,351, filed April 8, 1957, now abandoned, and entitled Transparent Electrically Conductive Film and Method of Making Same.

Transparent and electrically conductive films have been applied with a relative degree of success to the surfaces of materials such as glass or transparent plastic. Such coatings are particularly desirable on articles or surfaces through which visibility must be maintained under conditions which would ordinarily foster ice or snow accumulation. Exemplary of such an article is the windshield of an automobile or airplane; also goggles or binocular lenses may be readily adapted to use in severe weather when provided with a protective film.

The primary purpose of the film is to provide a simple means for heating the surface of the transparent base material thereby to obviate the presence of ice or moisture. Equally as important with heating though is the necessity of minimizing the reflective characteristics of the film which of course reduce light transmissivity. It has been found, for instance, that the surface of a glass window may be provided with a sufficient layer of electrically conductive material to serve as a heating element. In applying such a film, there are two primary considerations which must govern the nature of the conductive layer. First, the layer must be electrically continuous across the entire surface to be heated. Secondly, there is the necessity for controlling the composition of said layer in order to maintain a satisfactory amount of light transmissivity therethrough.

It is readily understandable that if an excessive amount of electrically conductive material such as silver or gold is applied to a surface, although an excellent electrical path will be formed, the light transmissivity will be reduced to a point where the coated article becomes opaque or impractical. On the other hand, should the particles of conducting element be too widely dispersed, there may result a satisfactory degree of light transmissivity, but a discontinuous heating layer.

Another factor which noticeably decreases the degree of light transmissivity through surface films is the presence of an adhesive layer of material which is generally disposed adjacent to and contacting the base material. While such a layer does serve the constructive purpose of binding the subsequently applied protective and heating layers to the case article, still the presence of such a layer decreases overall transparency.

It is therefore an object of the present invention to provide a transparent, electrically conductive film for use on a transparent surface;

A further object is to provide a film of the character described having an electrically conductive layer and interspersed protective layers;

Another object is to provide such a film possessing the favorable characteristics of a light transmissivity not less than 85% and electrical resistivity of not more than 10 ohms per square;

An additional object is to provide a process for applying such a film to the surface of a suitable article.

In the drawings:

FIG. 1 is a diagrammatic representation of the application of a layer prepared according to the invention as a transparent electrode for a photo-conducting cell;

FIG. 2 is similar to FIG. 1, showing the application of the layer prepared according to the invention as a transparent electrode for a photo-galvanic cell;

FIG. 3 is a highly magnified representation in section of a carrier material with applied lattice of electrically conducting material;

FIG. 4 illustrates the same carrier material after the covering and filling layer has been applied to the lattice;

FIG. 5 shows in schematic form a top view of the carrier material according to FIG. 3 covered with a lattice;

FIG. 6 illustrates diagrammatically a device for vaporizing-on the lattice; and

FIG. 7 is similar to FIG. 6 illustrating a device for the cathode evaporization-on of the covering and filling material.

The invention, in brief, contemplates essentially a pair of individual, yet interformed layers, neither of which acting of itself would produce the desired article, but when combined, the synergistic effect produces an electrically conductive film possessing 85% to 90% light transmissivity. Basically, the film takes the form of a resistance type electric heater, the heating element being a lattice-like layer of electrical current conducting particles so applied to the base material as to practically cover the surface of said material. The conductive layer, although interspersed with holes or spaces, is sufficiently joined through contacting of its particles as to be electrically continuous on its surface from one extreme to the other. A second or protective layer fills said spaces and covers the layer to find the pair against a base surface.

In order that such a physically discontinuous heating layer may conduct sufficient current, it is necessary to use a metal with a high electrical conductivity, notable of which is gold, silver or copper. The process of applying the heating layer, to be hereinafter discussed, so disposes the metallic particles about the base material surface as to form pockets or interstices in the structure, which pockets are subsequently filled with a metallic oxide to form a composite filler and protective covering layer.

Referring to FIG. 1, there is illustrated one embodiment of the invented film used in conjunction with a photosensitive article or base material such as a thickness 1 of cadmium sulphide, selenium, germanium or the like. These materials are characterized in that they exhibit a variable electrical resistance which is, broadly speaking, a function of the intensity of the radiation 2 impinging thereupon. The article sensing element is located between an opaque electrode 3 and a transparent electrode 4, the latter being the film described by the invention. A battery 5 and ammeter 6 electrically connected to the electrodes 3 and 4, respectively, complete the circuit. With such an arrangement, it is possible to determine the intensity of the radiation 2 by observing the circuit amperage as indicated on the ammeter 6.

Photo-conducting cells of this general construction in which the electrodes, one of which must be transparent, and applied to both main surfaces of the base 1, have considerable advantages over conventional cells in which two opaque electrodes are generally located at two opposite longitudinal edges of the base 1. For example, in the cells made according to the invention, a given amount of photo-sensitive material provides a great deal more effectiveness than an equivalent amount of material as used in cells of the prior art. Also, it is possible, by using such a layer, to work with a lower potential in the electrical circuit. Further, it is possible to adjust the impedance range of the cell to an optimum value in a relatively simple manner.

Another embodiment of the invented film is shown in FIG. 2 which represents a photo-galvanic cell, customarily used to convert radiation impinging on the cell, into electrical energy. This latter energy is produced in a very thin barrier layer 8 which, for maximum efficiency, presents to the source of radiation as large a surface as possible. As shown, the barrier layer 8 is located on a layer 9 of semi-conducting material and is covered by a transparent electrode 10. An opaque second electrode 11 is located underneath the semi-conducting layer 9. Both electrodes 10 and 11 are connected to the terminals 12 and 13 from which electric energy, dependent on the amount of incident light, can be picked off. Photo-sensitive materials for the semi-conducting layer 9 may be such as germanium, silicon and selenium.

In FIG. 3, there is shown a magnified view of a base article 14 upon whose surface in accordance with the invention, there has been deposited a plurality of very fine, electrically conductive particles 15 in the order of magnitude of 1000 A. As may be seen in FIG. 5, these particles are disposed in just sufficient quantity to afford point contacts between adjacent particles yet allow a great deal of space therebetween. In effect, the particles form a lattice or electrically conductive bridge across the carrier surface. The thickness of the lattice-like layer of electrically conductive material should be between about 100 and about 150 angstroms. The subsequently applied covering and filling material, as will be seen in FIG. 4, when deposited on the surface of the base material 14, will not only cover the lattice layer, but will also pass through the intermediate spaces 16 adhere to the base metal 14. The lattice or heater layer is thereby fixedly held in contact with the base material to facilitate heating of the latter.

The transparent, electrically conductive film and the process therefore as herein described, possesses many advantages over conventional films or coatings. For instance, one concept of the coating process, as practiced by the art, consists in applying metal salts, which are usually dissolved in a liquid, to a heated carrier body of silicon-containing material such as glass. A detailed description of such a process is given in "Procedures in Experimental Physics" by J. Strong, Prentice-Hall ed., New York, 1950, page 152. In conjunction with this process, it has been found that as a result of chemical reactions, there is formed on the surface of the carrier body a layer of metal oxide which lacks transparency. Also, even in the most favorable instance, the layer possesses relatively poor electrical conductivity. Thus, in a frequently used conductive layer such as tin oxide, a surface resistance of about 150 ohms/square area is quite common. As a matter of practicality, this means that for an automobile windshield equipped with such a layer, the usual automobile battery potential of 6 or 12 volts is grossly inadequate to furnish the necessary heating current.

According to the present invention, the covering and filling material subsequently applied to the electrically conductive lattice layer, reaches through the intermediate spaces of said layer and adheres to the carrier material. This not only fixes the lattice in position, but also provides a protective layer against mechanical and chemical influences. The mechanical resistance of such an arrangement of layers may be sufficiently resistant that scratching with a fingernail would leave no trace or mark. The covering and filling material according to the invention does not disadvantageously alter the electrical behavior of the lattice layer. Further, if the filling material is likewise electrically conductive, the conductivity of the composite layer will be improved.

It is a widely accepted practice in the preparation of electrically conductive transparent films to apply to the base material a preliminary adhesive layer such as, for instance, a metal oxide. Thereafter, a metal conductive layer and, on top of the latter, a protective and covering layer, again of a metal oxide, are applied successively. Aside from the fact that the presently known methods usually require a heat treating step which excludes a great number of very heat-sensitive carrier materials from the application, the use of a triple layer arrangement, as herein noted, entails more difficult and prolonged preparation with correspondingly higher costs. The thicker layer will also possess a much greater light absorption characteristic than that possessed by a double layer. A further disadvantage inherent with the heavier layer is that, due to the interposed adhesive layer, a direct contact between the electrically conducting layer and the carrier material does not exist.

On the other hand, the lattice layer of the invention, by virtue of its physical characteristics, displays excellent permeability to light. If, nevertheless, somewhat high diffusion effects should occur which tend to cause a decrease in the permeability to light, the layers may be so composed to overcome this effect.

As has been previously noted, while many metals are capable of providing an electrically conductive path, in the lattice layer, it is preferred to utilize a metal having high conductive capacity such as gold, silver, copper or platinum. Also, the particular metal chosen as the conductive element of the heating film is contingent on the filler material as will be hereinafter noted.

It is a generally accepted fact that if, of two substances of the same refractive index such as glass and benzene, one is embedded in the other, there will be between the two no noticeable line of demarcation. This phenomenon is attributable to the Christiansen filter effect and in essence eliminates reflection of light rays at the contacting surface of the two substances.

In applying this effect to the present invention by way of increasing light permeability, a heretofore unrecognized modification of the effect is utilized. In that the refractive indices of particles dimensionally less than the wave length of light, vary with the size of the particle, the refractive index of the electrically conductive material and that of the filling material should not be determined by the materials as such but rather by the size of the smallest particles.

It is well known that to suppress the reflection at the surface of a layer of metal, there may be applied a reflection-decreasing covering layer in a thickness which amounts to an odd multiple of $\eta/4$, where the designation $\eta$ is the wavelength of the incident light employed. In this respect, optimum results are obtained if the refractive index of the electrically conductive lattice layer and the index of the cover layer material are in a root relation. In the composite film of the present invention, the refractive indices of the particles comprising the lattice-like layer and the covering oxide layer are preferably approximately equal. For example, referring to FIGS. 3 and 4, if the particles 15 comprising the electrically conductive film have a refractive index $n_1$, the covering and filling 17 should have index $n_2$, the value of which equals or at least approximates $n_1$. Should these indices be sufficiently close, the Christiansen filter effect would achieve optimum values.

It has been found, for instance, that the light transmissivity characteristic of a composite film of the type invented will be excellent where the combined layer thicknesses lie within the range between 200 and 1000 A. For visible light, optimal transmissivity is obtained when the film thickness is maintained between 300 and 400 A.

In reference to the electrically conductive layer, the more minute the applied particles of said material are, the better will be the conductivity of the lattice. The preferred use of smaller particles in the lattice formation stems from the greater probability of said formation occurring than will be experienced by use of larger particles.

It has therefore been determined that the particle size should be, as far as possible, below 1000 A. and preferably below 500 A., i.e., considerably below the wave length of light.

In order to form such small particles of the electrically conductive material, it is recommended that the process of application be carried out by means of evaporation in a high vacuum and with very rapid heating so as to obtain a high deposition rate, preferably greater than 50 A. per second. This process is generally referred to as flash evaporation and is completely described in an article by R. P. Sennett and G. D. Scott published in the Journal of the Optical Society, vol. 40, I, 1950, p. 203.

It has been found, regarding the conductivity of layers applied by vaporization at different speeds, that the amount of material deposited is greater, as the vaporizing-on action proceeds more rapidly. This phenomena is explained by the fact that the vaporized particles which form seeds initially strike the base material form seeds which increase in magnitude by the addition of further material up to the final particle size. If then on the one hand, the number of particle seeds is increased by rapid vaporizing-on, and if concurrently, the time of growth is shortened, there results the desired very fine particles. A similar effect may likewise be obtained by strong cooling of the carrier material. Even purely chemically-acting processes for the formation of these fine particles can also be used.

An essential concept of the invention requires that the covering and filling material adhere tenaciously to the surface of the base or carrier material thereby to anchor the lattice. This can be effected particularly well if the covering and filling material is applied by means of cathode evaporation, preferably under decreased pressure. This action, in brief, flings the individual particles of vaporized material with great force and at relatively high speed onto the carrier material thereby forming an intimate attachment to the lattice and providing a satisfactory anchoring means to the base surface.

For the composite film arrangement, the heating layer should of course be made up of particles of a highly conductive metal as gold or silver; the filling and covering materials are preferably of a metal oxide. One embodiment of the invention resides in the combination comprising a lattice of gold particles with a covering and filling layer of bismuth oxide. More specifically, it has been found very advantageous to form the lattice of silver particles and to use indium oxide or zinc oxide for covering and filling. Such a layer arrangement distinguishes itself in that, over almost the entire range of the visible spectrum, a permeability of 85% to 90% and above are obtained. It is also noted that simultaneously a surface resistance of 10 ohms/square area, even of 5 ohms/square area are made possible. Such a high permeability to light, together with the favorable value of electrical conductivity, have been heretofore unattainable in heatable films.

The combinations of silver-indium oxide and silver-zinc oxide possess the advantage that, while they are quite permeable to the visible light having wave lengths of between 4000 A. and 8000 A., they reflect infra-red rays; the limiting value of transmitted light being about 12,000 A. Accordingly, articles such as heatable windows can be prepared using the film of the invention, which articles are highly permeable to visible light but, at the same time, reject harmful infra-red rays.

The heat resistance of such a layer when utilized on a base material as glass, is excellent. Tests have shown, for instance, that at a heating capacity of 2 watts/cm.$^2$ and temperatures of between 150° C. and 200° C., at which thermal stresses caused the glass to crack, the composite film arrangement remained completely intact.

If the covering and filling material is to be applied by means of cathodic evaporation, it is preferred to carry out the process in an atmosphere of rare gas such as argon, to which a small amount of oxygen has been added to bring about the necessary oxidation on the path between the cathode and the carrier.

When applying indium oxide or zinc oxide, it is sufficient to provide an argon atmosphere containing about 1% to 2% oxygen. Among other things, maintenance of this atmosphere offers a degree of assurance that the oxidation of the metal to be vaporized takes place only on the path between the cathode and the carrier material rather than directly on the cathode; the latter action would otherwise delay the desired rapid vaporization. A further advantage derived by the limitation of oxygen resides in elimination of the possibility of oxidation of the conductive metal before said metal is covered by the oxide layer. In this case, the combinations comprising silver-indium oxide and silver-zinc oxide are likewise very advantageous. For example, the low oxygen percentage of 1% to 2%, while adequate for the oxidation of the indium or of the zinc, is not sufficient to cause an oxidation of the silver. In other composite film combinations it is of course quite possible to use higher oxygen proportions.

In FIG. 6, there is illustrated an embodiment of the apparatus according to the invention, for applying the vaporized-on film to an article such as a glass plate. A preferred method for carrying out the process includes the following steps:

The chamber 18 may be evacuated by means of a suitable vacuum pump to a pressure below atmospheric. The carried material 20 is located above a heating device 21 wherein the material 22 to be evaporated is located. The heating device 21 in this instance comprises an electric resistor which may assume any suitable shape appropriate to containing and heating the metal. For vaporizing-on, a relatively high potential is applied to the heater terminals so that the high current flowing through the said device causes a very rapid heating and evaporation of the material 22 which, as previously mentioned, makes possible the formation on the surface of 20, a lattice structure comprising very fine particles.

The total electrical resistance of the continuous lattice layer depends on the mean thickness per area of the particles as well as on the speed of evaporation. Thus, a layer with a calculated thickness of less than 40 A. showed essentially an infinite resistance, presumedly due to the non-continuity of the lattice layer. If the calculated layer thickness increases, the resistance decreases correspondingly. This is amply illustrated in the following data which tabulates the relative degree of light transmissivity and surface resistance for various thicknesses of lattice layer.

| Equivalent Lattice Thickness, A. | Surface Resistance, ohms/sq. | Light Transmissivity |
|---|---|---|
| 40 | very high | good. |
| 100 | 5-10 | optimum. |
| 200 | 2 | weak. |

An alternate method for obtaining fine lattice particles resides in cooling the base material by use of a medium such as carbon dioxide or liquid air.

The apparatus shown in FIG. 7 illustrates the equipment for the cathodic dusting onto the lattice layer and base material of a covering and filling layer. The following description made in conjunction therewith is indicative of a preferred method for applying the outer layer to a lattice covered surface of the article 20. The space below a hood 23 is evacuated by means of a vacuum pump connected to the short connecting pipe 24. An inert gas such as argon, admixed with about one percent oxygen, is then admitted through a valve 25, to a pressure of about 10$^{-4}$ mm. Hg in the chamber. The chamber material 20, previously covered with a lattice 26 of electrically conducting, very fine particles, is held between electrodes 27 and 28 which are of equal potential.

One electrode 28 has a central opening which exposes the lattice faced surface of the carrier material. The material 27 used as starting material for the cathodic evaporation is provided in the form of a block, or as foil wrapped around a conductor below the carrier material 20. A source of high potential is applied to terminals leading to the electrodes 27 and 28, and to the block, this potential is adaptable to be adjusted between values of 1000 volts and 5000 volts. The starting material 29 is generally a metal, the oxide of which is produced in the discharge by the reaction with the oxygen contained in the inert gas.

In a test for applying indium oxide or zinc oxide to a lattice layer of silver, the pressure in the space under the hood 23 was so adjusted that the dark space around the cathode achieved a length of about 5 cm. The distance of the cathode from the carrier material likewise amounted to about 5 cm. The process took a total of about 25 minutes, with a current density of 0.1 ma./cm.² being maintained. During this time, the temperature of the article 20 increased to only about 50° C. Should such a rise in temperature for some reason be undesirable, the material may be held at a lower temperature by cooling as previously mentioned, i.e., carbon dioxide, etc.

While the coating process may be carried in two steps and using separate units of equipment as herein recited, it is quite possible that the same process may readily be accomplished in a single chamber if the chamber is properly equipped. Also, additional layers of material may be further applied to the transparent, electrically conductive film without departing from the spirit of the invention.

The invention was satisfactorily demonstrated by the application of a silver-indium oxide film to the surface of a glass plate using the following procedure:

*Example I*

(A) A polished glass plate 20 x 71 x 1 mm. was carefully degreased in a detergent solution, then rinsed in distilled water and dried with a spotless clean cloth. This glass plate was then placed in the vacuum chamber 18 described in FIG. 6. A small piece of pure silver wire (0.2 mm. diameter) and weighing 10 mgr. was then put into the boat 21 which is made preferably of molybdenum. The distance between the glass plate 20 and the boat 21 is 18-19 cm.

(B) The glass plate was temporarily masked by means of a removable metal screen and the pressure inside the chamber 18 then reduced to 10⁻⁴ mm. Hg. The silver was melted in order to remove all traces of impurities and occluded gas, by passing a current through boat 21. Thereafter, the metal screen was removed and a very high current, e.g., 36-38 amp. was passed through the boat for a very short period, resulting in a very rapid deposition rate of silver particles onto the glass plate.

The equivalent thickness of the lattice-like layer on measurement was found to be 100-105 A. and its surface resistance equal to 5.5 ohms per square. The light transmissivity of said lattice-like layer was found to be 74% with 4000 A. light, which value decreased progressively to about 45% using light having wave lengths up to 7250 A.

The method used for determining layer thickness is a standard procedure which consists primarily of impinging a beam of white light onto the subject film and thereafter observing the color of the reflected beam. If the wave length of the measuring light is of a predetermined value in A. units, the color of the reflected beam will be an indication of the film thickness being measured.

(C) The sputtering-on of indium oxide was performed in the apparatus described in FIG. 7. The distance between the cathode 29 which is made of pure indium (in shape of a disk 2 mm. thick and 140 mm. diameter) and the anode 28 is 63 mm. A gaseous mixture of oxygen to which 2% argon had been added was then supplied to the chamber after which a potential of 1500 volts was applied to the electrodes at a current amperage of 25 m. amps., which is equivalent to a current density of 0.2 m. amp./cm.²

During the vaporizing-on process, the beam of light as described above was directed onto the surface being coated and the reflected beam then evaluated. After about 20 minutes of coating, the reflected light registered red-violet, which when resulting from a light of 4000 A., indicates a film thickness of 350 A. At this point, the process was terminated and the film tested for light transmissivity and surface resistance.

The film produced was found to have a surface resistance of 7 ohms per square and a light transmissivity for light of 4000 and 7250 A., 92% and 73%, respectively.

The permanency of the composite film may be ascertained by scratching the coated surface with a fingernail or similar instrument; such a test shows no substantial effect on the film. Had the film comprised a solid layer of conductive material with a protective layer thereon, there would be of course no anchoring means and the film would be readily removed.

*Example II*

In a further example of the invention, a substantially identical procedure as outline in Example I was utilized to apply a coating of zinc oxide onto a lattice-like conductive layer of silver. The conductive layer was applied to a thickness of 100-105 A., and the composite or complete layer totaled 350 A. A test of this film for surface resistance indicated a value of 7 ohms/sq.; the light transmissivity characteristic for white light of 4000 and 7250 A. was 87% and 54% respectively.

*Example III*

Again the method as shown in Example I was followed in applying a silver-indium oxide film to a sheet of Plexiglass rather than glass. The results using the plastic base material compare favorably with those obtained with a glass base. Namely, the surface resistance 7 ohms/sq. and light transmissivity 90% for 4000 A. light and 75% for 7250 A. light. In this example, the lattice film was 100-105 A., in thickness and the composite film 350 A., which film was resistant to scratching as noted previously.

What is claimed is:

1. An article consisting of a base material; a lattice-like layer of electrically conductive material in molecular contact with said base material, said lattice-like layer having an electrical resistance of less than ten ohms per square area and a thickness between 100 and 150 angstroms; and a continuous layer of metal oxide covering said lattice-layer so as to fill the interstices of said lattice-like layer and adhere to said base material, the composite film formed by said lattice-like layer and said continuous layer being transparent and having a thickness between about 200 and about 1000 angstroms.

2. An article as defined in claim 1 wherein said composite film has a thickness between about 300 and about 400 angstroms.

3. An article as defined in claim 1 wherein said electrically conductive material is in particles of a size less than about 1000 angstroms.

4. An article as defined in claim 1 wherein said electrically conductive material is in particles of a size less than about 500 angstroms.

5. An article as defined in claim 1 wherein said base material is a photo-sensitive material.

6. An article as defined in claim 1 wherein said base material is glass.

7. An article as defined in claim 1 wherein said base material is a plastic material.

8. An article as defined in claim 1 wherein said electrically conductive material is silver and said metal oxide is indium oxide.

9. An article as defined in claim 1 wherein said electrically conductive material is gold and said metal oxide is bismuth oxide.

10. An article as defined in claim 1 wherein said electrically conductive material is silver and said metal oxide is zinc oxide.

11. An article consisting of a base material; a lattice-like layer of electrically conductive material in molecular contact with said base material, said lattice-like layer having an electrical resistance of less than ten ohms per square area and a thickness between 100 and 150 angstroms; and a continuous layer of metal oxide covering said lattice-like layer so as to fill the interstices thereof and adhere to said base material, the composite film formed by said lattice-like layer and said continuous layer having a light transmissivity of at least 85 percent.

12. A process for the preparation of a transparent, electrically conductive film on a base material consisting essentially of the steps of: depositing a lattice-like layer of electrically conductive material onto said base material at a rate at least as high as 50 angstroms per second until said lattice-like layer is between about 100 and about 150 angstroms thick; and disposing a continuous layer of metal oxide over said lattice-like layer so as to fill the interstices of said lattice-like layer and adhere to said base material until the composite film formed by said lattice-like layer and said continuous layer has a thickness between about 200 and about 1000 angstroms.

13. A process for the preparation of a transparent, electrically conductive film on a base material consisting essentially of the steps of: depositing a lattice-like layer of electrically conductive material onto said base material at a rate at least as high as 50 angstroms per second until said lattice-like layer has an electrical resistance less than ten ohms per square area and a thickness between 100 and 150 angstroms, and disposing a continuous layer of metal oxide over said lattice-like layer so as to fill the interstices of said lattice-like layer and adhere to said base material until the composite film formed by said lattice-like layer and said continuous layer has a light transmissivity of at least 85 percent.

14. A process for the preparation of a transparent, electrically conductive film on a base material consisting essentially of the steps of: vacuum depositing a lattice-like layer of electrically conductive material onto said base material until said lattice-like layer is between about 100 and about 150 angstroms thick; and cathode sputtering a continuous layer of metal oxide over said lattice-like layer so as to fill the interstices of said lattice-like layer and adhere to said base material until the composite film formed by said lattice-like layer and said continuous layer has a thickness between about 200 and about 1000 angstroms in thickness.

15. A process for the preparation of a transparent, electrically conductive film on a base material consisting essentially of the steps of: vacuum depositing a lattice-like layer of electrically conductive material onto said base material until said lattice-like layer has an electrical resistance of less than about ten ohms per square area and a thickness between about 100 and about 150 angstroms; and cathode sputtering a continuous layer of metal oxide over said lattice-like layer so as to fill the interstices of said lattice-like layer and adhere to said base material until the composite film formed by said lattice-like layer and said continuous layer has a light transmissivity of at least 85 percent.

References Cited in the file of this patent

UNITED STATES PATENTS

| | | |
|---|---|---|
| 2,489,127 | Forgue | Nov. 22, 1949 |
| 2,825,687 | Preston et al. | Mar. 4, 1958 |

OTHER REFERENCES

Holland: "Vacuum Deposition of Thin Films," 1956, pages 206, 207 and 208, John Wiley and Sons.